US 8,989,299 B2

(12) United States Patent
Zhou et al.

(10) Patent No.: US 8,989,299 B2
(45) Date of Patent: Mar. 24, 2015

(54) METHOD AND DEVICE OF SENDING AND RECEIVING PRECODING INFORMATION

(71) Applicant: Huawei Technologies Co., Ltd., Shenzhen (CN)

(72) Inventors: Yongxing Zhou, Shenzhen (CN); Jianguo Wang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 13/681,029

(22) Filed: Nov. 19, 2012

(65) Prior Publication Data

US 2013/0077709 A1 Mar. 28, 2013

Related U.S. Application Data

(63) Continuation of application No. PCT/CN2011/074325, filed on May 19, 2011.

(30) Foreign Application Priority Data

May 19, 2010 (CN) .......................... 2010 1 0184063

(51) Int. Cl.
*H04B 15/00* (2006.01)
*H04L 25/00* (2006.01)
(Continued)

(52) U.S. Cl.
CPC .............. *H04L 25/00* (2013.01); *H04B 7/0639* (2013.01); *H04L 1/007* (2013.01); *H04L 1/0072* (2013.01); *H04L 25/03898* (2013.01); *H04L 25/03949* (2013.01); *H04L 5/0007* (2013.01); *H04W 28/04* (2013.01); *H04L 1/0026* (2013.01); *H04L 1/0071* (2013.01); *H04L 5/0048* (2013.01)
USPC ............ 375/285; 375/296; 375/346; 375/358

(58) Field of Classification Search
USPC ................ 375/130–133, 140, 141, 259–260, 375/295–296, 316, 340–342, 346, 349
See application file for complete search history.

(56) References Cited

U.S. PATENT DOCUMENTS 8,135,082 B2 *   3/2012   Choi et al. .................... 375/264
2007/0141994 A1   6/2007   Cheng
(Continued)

FOREIGN PATENT DOCUMENTS

CN         101331700 A     12/2008
CN         101610523 A     12/2009
(Continued)

OTHER PUBLICATIONS

First Office Action of Chinese Application No. 201010184063.9 mailed Jan. 4, 2013, 10 pages. (Partial Translation).

(Continued)

*Primary Examiner* — Sam K Ahn
*Assistant Examiner* — James M Perez
(74) *Attorney, Agent, or Firm* — Huawei Technologies Co., Ltd (57) ABSTRACT

The present invention discloses a method and a device of sending and receiving precoding information. A terminal terminal obtains a wideband precoding matrix indicator PMI. The terminal encodes an MSB of the wideband PMI to obtain encoded information. The MSB of the wideband PMI is encoded separately or jointly with other information and the MSB is a part of the wideband PMI. The terminal sends encoded information to a data sending end.

20 Claims, 4 Drawing Sheets

(51) Int. Cl.
*H04B 7/06* (2006.01)
*H04L 1/00* (2006.01)
*H04L 25/03* (2006.01)
*H04L 5/00* (2006.01)
*H04W 28/04* (2009.01)

(56) References Cited

U.S. PATENT DOCUMENTS

| | | | |
|---|---|---|---|
| 2008/0043867 | A1 | 2/2008 | Blanz et al. |
| 2008/0080431 | A1 | 4/2008 | Zeira et al. |
| 2008/0273624 | A1 | 11/2008 | Kent et al. |
| 2009/0006925 | A1 | 1/2009 | Pan |
| 2009/0046569 | A1* | 2/2009 | Chen et al. ............ 370/203 |
| 2009/0046805 | A1* | 2/2009 | Kim et al. ............ 375/295 |
| 2009/0199055 | A1* | 8/2009 | Chen et al. ............ 714/701 |
| 2009/0201825 | A1* | 8/2009 | Shen et al. ............ 370/252 |
| 2009/0262854 | A1 | 10/2009 | Lee et al. |
| 2009/0285193 | A1* | 11/2009 | Kim et al. ............ 370/342 |
| 2009/0296850 | A1 | 12/2009 | Xu et al. |
| 2010/0034312 | A1* | 2/2010 | Muharemovic et al. ...... 375/267 |
| 2011/0216846 | A1* | 9/2011 | Lee et al. ............ 375/295 |

FOREIGN PATENT DOCUMENTS

| | | |
|---|---|---|
| CN | 101689963 A | 3/2010 |
| CN | 101969367 A | 2/2011 |
| JP | 2010-502114 A | 1/2010 |
| WO | WO 2008/154201 A2 | 12/2008 |
| WO | WO 2009/134913 A1 | 11/2009 |

OTHER PUBLICATIONS

3$^{rd}$ Generation Partnership Project; Technical Specification Group Radio Access Network; Evolved Universal Terrestrial Radio Access (E-UTRA); Multiplexing and channel coding (Release 8), DRAFT 3GPP TS 36.212 V8.7.0, May 2009, 60 pages.

Extended European Search Report received in Application No. 11782955.6-1851, Applicant: Huawei Technologies Co., Ltd., mailed Feb. 14, 2013.

Written Opinion of the International Searching Authority received in International Application No. PCT/CN2011/074325, Applicant: Huawei Technologies Co., Ltd. et al., mailed Sep. 1, 2011, 6 pages.

International Search Report received in International Application No. PCT/CN2011/074325, Applicant: Huawei Technologies Co., Ltd. et al., mailed Sep. 1, 2011, 30 pages.

Search Report received in Application No. 2010101840639 mailed Dec. 21, 2012, 3 pages.

3$^{rd}$ Generation Partnership Project; Technical Specification Group Radio Access Network; Evolved Universal Terrestrial Radio Access (E-UTRA); Multiplexing and channel coding (Release 9), 3GPP TS 36.212 V9.0.0, Dec. 2009, 61 pages.

3$^{rd}$ Generation Partnership Project; Technical Specification Group Radio Access (E-UTRA); Physical layer procedures (Release 9), 3GPP TS 36.213 V9.1.0, Mar. 2010, 79 pages.

Japanese Office Action received in Application No. 2013-510493, mailed Oct. 15, 2013, 10 pages.

Texas Instruments, "Error Protection of CQI Reporting," 3GPP TSG RAN WG1 #52bis, R1-081371, Shenzhen, China, Mar. 31-Apr. 4, 2008, 4 pages.

* cited by examiner

FIG. 1

|   | First time slot | | | | | | | Second time slot | | | | | | |
|---|---|---|---|---|---|---|---|---|---|---|---|---|---|---|
| S0 | S1 | S2 | S3 | S4 | S5 | S6 | S7 | S8 | S9 | S10 | S11 | S12 | S13 |
|  |  |  | RS |  |  |  |  |  |  | RS |  |  |  |
|  |  |  | RS |  |  |  |  |  |  | RS |  |  |  |
|  |  |  | RS |  |  |  |  |  |  | RS |  |  |  |
|  |  |  | RS |  |  |  |  |  |  | RS |  |  |  |
|  |  |  | RS |  |  |  |  |  |  | RS |  |  |  |
|  |  |  | RS |  |  |  |  |  |  | RS |  |  |  |
|  |  |  | RS |  |  |  |  |  |  | RS |  |  |  |
|  |  |  | RS |  |  |  |  |  |  | RS |  |  |  |
|  |  |  | RS |  |  |  |  |  |  | RS |  |  |  |
|  |  |  | RS |  |  |  |  |  |  | RS |  |  |  |
|  | MSB |  | RS |  | MSB |  |  | MSB |  | RS |  | MSB |  |
|  | MSB |  | RS |  | MSB |  |  | MSB |  | RS |  | MSB |  |
|  | MSB |  | RS |  | MSB |  |  | MSB |  | RS |  | MSB |  |

←→ SC-FDMA symbol

METHOD AND DEVICE OF SENDING AND RECEIVING PRECODING INFORMATION

This application is a continuation of co-pending International Application No. PCT/CN2011/074325, filed May 19, 2011, which claims priority to Chinese Patent Application No. 201010184063.9, filed May 19, 2010, both of which applications are incorporated herein by reference.

TECHNICAL FIELD

The present invention relates to the field of communications technologies, and in particular, to a method and a device of sending and receiving precoding information.

BACKGROUND

With the continuous development of communications technologies, to improve the performance of data transmission, a data sending end (for example, NodeB (node B) or BS (Base Station, base station)) may pre-process data to be sent according to precoding information (for example, PMI (Precoding Matrix Indicator, precoding matrix indicator)) which is fed back by a terminal (for example, UE (User Equipment, user equipment) or MS (Mobile Station, mobile station)) and a locally pre-stored codebook, and then send the data to the terminal, so that the data sending process may adapt to a channel state variation, thereby improving the performance of the data transmission. Therefore, how to send and receive the precoding information is crucial.

The existing 3GPP LTE R8 (3rd Generation Partnership Project Long Term Evolution Release 8, 3rd Generation Partnership Project Long Term Evolution Release 8) system adopts a single codebook, and a precoding matrix of the codebook is indexed by a single PMI (Precoding Matrix Indicator, precoding matrix indicator), and may be periodically and aperiodically reported respectively through a PUCCH (Physical Uplink Control Channel, physical uplink control channel) and a PUSCH (Physical Uplink Shared Channel, physical uplink shared channel).

In the implementation of the present invention, the inventors find that the prior art at least has the following problem:

The wideband precoding matrix indicator PMI easily incurs error propagation. Therefore, it is necessary to further study a reporting mode to improve the system performance.

SUMMARY OF THE INVENTION

Embodiments of the present invention provide a method and a device of sending and receiving precoding information, so as to improve the system performance.

In one aspect, an embodiment of the present invention provides a method of sending precoding information, which includes obtaining, by a terminal, a wideband precoding matrix indicator PMI, separately encoding, by the terminal, an MSB of the wideband PMI or jointly encoding the MSB of the wideband PMI and other information of N bits to obtain encoded information, where the MSB is a part of the wideband PMI, and N is a natural number and sending, by the terminal, the encoded information to a data sending end.

In one aspect, an embodiment of the present invention provides a method of receiving precoding information, which includes receiving, by a data sending end, encoded information sent by a terminal, where, the encoded information is information obtained, after the terminal obtains the wideband precoding matrix indicator PMI, through separately encoding an MSB of a wideband PMI or jointly encoding the MSB of the wideband PMI and other information of N bits, where the MSB is a part of the wideband PMI, and N is a natural number.

In another aspect, an embodiment of the present invention provides a device of sending precoding information, which includes an information obtaining unit, configured to obtain a wideband precoding matrix indicator PMI an information encoding unit, configured to separately encode an MSB of the wideband PMI or jointly encode the MSB of the wideband PMI and other information of N bits to obtain encoded information, where the MSB is a part of the wideband PMI, and N is a natural number, and an information sending unit, configured to send the information encoded by the information encoding unit to a data sending end.

In another aspect, an embodiment of the present invention provides a device of receiving precoding information, which includes an information receiving unit, configured to receive encoded information sent by a terminal where, the encoded information is information obtained, after the terminal obtains the wideband precoding matrix indicator PMI, through separately encoding an MSB of a wideband PMI or jointly encoding the MSB of the wideband PMI and other information of N bits, where the MSB is a part of the wideband PMI, and N is a natural number.

In the embodiments of the present invention, the MSB in the wideband PMI is separately encoded and then sent, or the MSB in the wideband PMI and other information of N bits are jointly encoded and then sent, which improves reliability of wideband precoding information, and reduces error propagation, thereby further improving the precoding performance.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

In order to make the objectives, technical solutions and advantages of the present invention clearer, the embodiments of the present invention are described in detail in the following with reference to the accompanying drawings.

Figure 1:
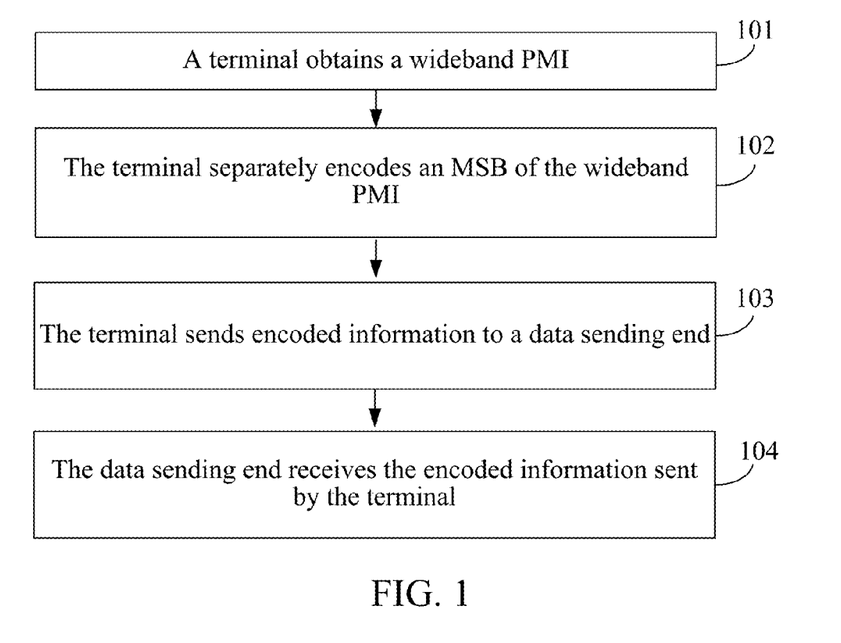
FIG. 1 is a schematic flowchart of a method of sending and receiving precoding information provided by an embodiment of the present invention.

Referring to FIG. 1, an embodiment of the present invention provides a method of sending precoding information, where a system bandwidth is divided into at least one subband, and the method includes the following steps.

101: A terminal obtains a wideband PMI.

Specifically, the terminal may obtain the wideband PMI according to a preset criterion, and definitely may also obtain the wideband PMI according to other methods in the prior art. In an example where the terminal obtains the wideband PMI according to the preset criterion, the terminal may calculate the wideband precoding matrix indicator PMI on the basis of a preset criterion 1, which is specifically shown in Equation (1):

$$j_0 = \arg\max_{j=0,\ldots,|C|-1, W_j \in C} f_1(W_j), \quad (1)$$

where $W_j$ represents a code word in a single codebook C, and $f_1(W_j)$ represents an objective function of the system bandwidth and a precoding matrix $W_j$ corresponding to the preset criterion 1. It should be noted that, the preset criterion 1 may be a throughput maximization criterion, an objective function corresponding to the criterion may be a throughput maximization function, and the throughput maximization function may be implemented on the basis of information capacity calculation or on the basis of mutual information or deformation of the mutual information (for example, weighting of mutual information). The embodiment in which the preset criterion 1 is a capacity maximization criterion is similar to the above embodiment, which is not described in detail here again. Definitely, the target function corresponding to the preset criterion may also be flexibly set according to a practical application condition, which is not specifically restricted here.

Alternatively, the terminal calculates the wideband precoding matrix indicator PMI based on a preset criterion 2, which is specifically shown in Equations (2) and (3):

$$j_{0,1} = \arg\max_{j_{k,1}=0,\ldots,|C_1|-1, W_{j_{k,1}} \in C_1} f_2(W_{j_{k,1}}); \quad (2)$$

and $$f_2(W_{j_{k,1}}) = \sum_{i=0}^{N_S-1} \max_{j_{k,2}=0,\ldots,|C_2|-1, W_{j_{k,2}} \in C_2} f_s(i, g(W_{j_{k,1}}, W_{j_{k,2}})), \quad (3)$$

where, $g(W_{j_{k,1}}, W_{j_{k,2}}) = W_j$ represents a precoding matrix, and is a function of two matrixes $W_{j_{k,1}}$ and $W_{j_{k,2}}$. The matrixes $W_{j_{k,1}}$ and $W_{j_{k,2}}$ are indexed from two codebooks C1 and C2 respectively through $j_{k,1}$ and $j_{k,2}$, and are respectively used for indicating a wideband property and a frequency selectivity property of the channel. $f_2(W_{j_{k,1}})$ represents an objective function of the system bandwidth and a wideband precoding matrix $W_{j_{k,1}}$ that are corresponding to the preset criterion 2. $f_s(i, W_j)$ represents an objective function of a sub-band i and a precoding matrix $W_j$ that are corresponding to the preset criterion 2, and $N_S$ is the total number of sub-bands forming the system bandwidth. Here, $j_{k,1}$ is referred to as a wideband precoding matrix indicator, that is, the wideband PMI.

It should be noted that, the preset criterion 2 may be a throughput maximization criterion, an objective function corresponding to the criterion may be a throughput maximization function, and the throughput maximization function may be implemented on the basis of information capacity calculation or on the basis of mutual information or deformation of mutual information (for example, weighting of mutual information). Definitely, the target function corresponding to the preset criterion may also be flexibly set according to an actual application condition, which is not specifically restricted here.

Further, after obtaining the wideband PMI, the method may also include the following steps.

102: The terminal separately encodes an MSB (Most Significant Bits, Most Significant Bit) of the wideband PMI, where, the MSB may be a part of the wideband PMI.

Specifically, the MSB (Most Significant Bits, Most Significant Bit) of the wideband PMI obtained in step 101 is represented by $a_0, a_1, a_2, a_3, \ldots, a_{A-1}$, where A is the number of bits of the MSB of the wideband PMI.

The terminal may encode the MSB of the wideband PMI obtained in step 101 through one code (20, A) (referring to 3GPP LTE TS 36.212 V9.0.0), where a code word of the code (20, A) is a linear combination of 13 basic sequences, the basic sequence may be expressed as $M_{i,n}$, i=0, ..., 19; n=0, ..., 12, and specifically $M_{i,n}$ be defined as shown in Table 5.2.3.3-1 in 3GPP LTE TS 36.212 V9.0.0. Encoded bits may be expressed as $b_0, b_1, b_2, b_3, \ldots, b_{19}$, and each bit may be expressed as:

$$b_i = \sum_{n=0}^{A-1} (a_n \cdot M_{i,n}) \mod 2, \quad i = 0, \ldots, 19. \quad (4)$$

Definitely, an applied encoding method may also be flexibly selected according to a practical application condition, which is not specifically restricted here.

Moreover, it should be noted that, the MSB of the wideband PMI may be a part of the wideband PMI, or may be all bits of the wideband PMI. When the MSB is a part of the wideband PMI, the MSB being only a part of the wideband PMI is separately encoded and sent, so that the overhead is saved as compared with the case that the entire wideband PMI is separately encoded and sent. In addition, the MSB is used as main component information of the PMI, and even if other component information of the PMI than the MSB, such as an LSB (Least Significant Bits, Least Significant Bit), is not correctly sent, the influence on the system performance is small.

103: The terminal sends the encoded information to a data sending end.

Specifically, the terminal may send the encoded information to the data sending end through a physical uplink control channel PUCCH. Further, when the encoded information is sent through the PUCCH, a period same as that of a rank indication (RI) may be used or, the terminal may send the encoded information to the data sending end through a physical uplink shared channel PUSCH.

Figure 2:
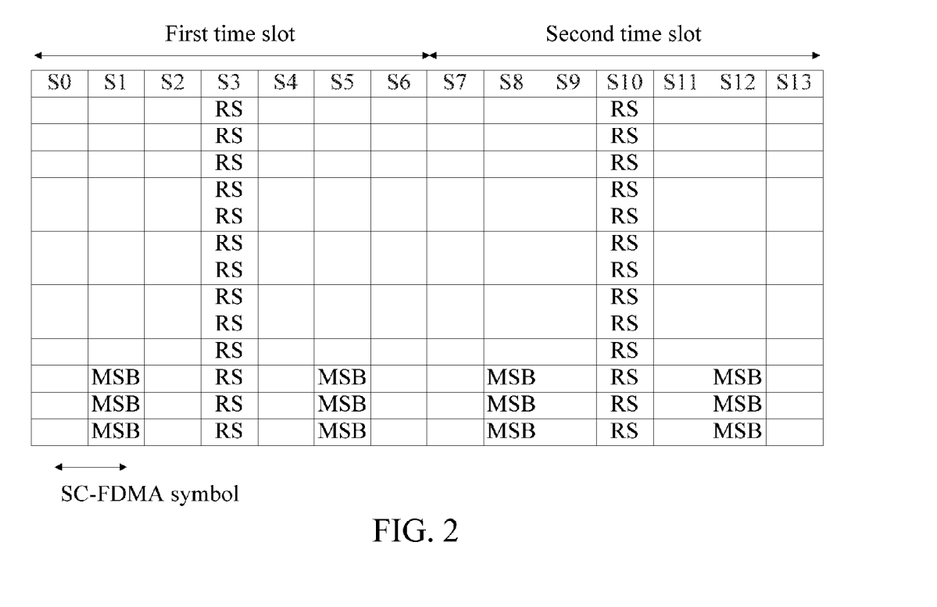
FIG. 2 is a schematic diagram of resource mapping of encoded information on a PUSCH provided by an embodiment of the present invention.
Figure 3:
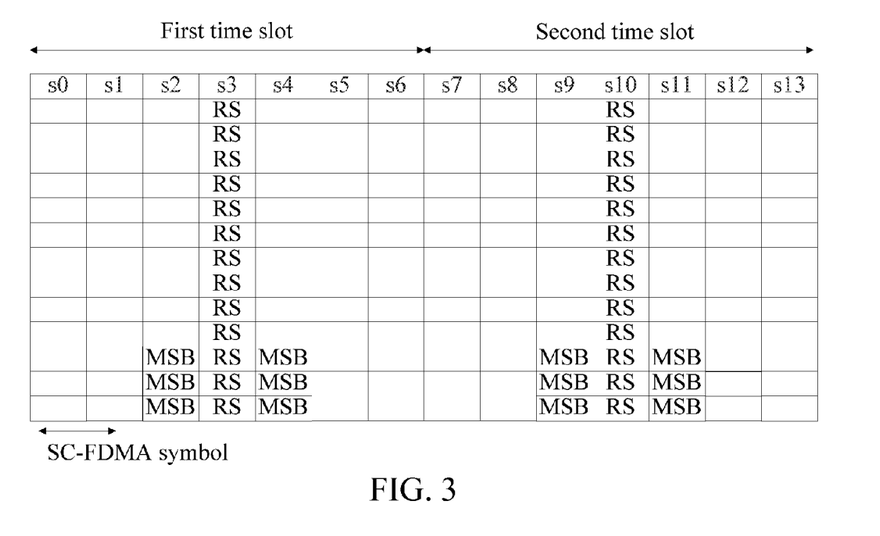
FIG. 3 is another schematic diagram of resource mapping of coded information on a PUSCH provided by an embodiment of the present invention.

Further, the encoded information may be mapped to a position that is on the two sides of a demodulation pilot or reference signal and is adjacent to a PUSCH demodulation pilot or reference signal (Reference Signal, RS) through a channel interleaver, as shown in FIG. 2 or FIG. 3, where S0 to S13 represent SC-FDMA symbols in a sub-frame, MSB blocks show positions to which the encoded information is mapped, and RS blocks show positions to which the RS is mapped.

Further, when the PUSCH adopts MIMO (multiple input multiple output, multiple input multiple output) multi-layer transmission, the encoded information may be mapped to all layers for transmission.

104: The data sending end receives the encoded information sent by the terminal.

Specifically, the data sending end may receive the encoded information sent by the terminal through a physical uplink control channel PUCCH or, specifically, the data sending end may receive the encoded information sent by the terminal through a physical uplink shared channel PUSCH.

Further, when the data sending end receives the encoded information sent by the terminal through the physical uplink shared channel PUSCH, the encoded information may be mapped to a position that is on the two sides of a demodulation pilot or reference signal and is adjacent to the demodulation pilot or reference signal through a channel interleaver, and received at positions shown by MSBs in FIG. 2 or FIG. 3.

It should be further noted that, a mapping relationship exists between a precoding matrix indicator PMI and a precoding matrix, the mapping relationship enables a distance between precoding matrixes corresponding to two PMIs with different most significant bits MSBs to be greater than a distance between precoding matrixes corresponding to two PMIs with different least significant bits LSBs, and the distance may be defined as a chord distance:

$$d_{A,B}=\|A^H B - BA^H\|_F \quad (5),$$

where, $d_{A,B}$ represents a chord distance between two matrixes A and B with the same dimension, $A^H$ represents conjugate transpose of the matrix A, and $\|\cdot\|_F$ represents Frobenius norm. Definitely, the distance may also be flexibly defined according to an actual application condition, which is not specifically restricted here.

It should be noted that, the MSB of the wideband PMI may be a part of the wideband PMI or the entire wideband PMI.

Moreover, it should be noted that, after obtaining the MSB of the wideband PMI, the data sending end may further obtain a reliable wideband or frequency selectivity precoding matrix, together with wideband or frequency selectivity precoding information obtained through other feedback manners.

In the method of sending and receiving precoding information described in the embodiment of the present invention, the MSB in the wideband PMI is separately encoded and sent, which improves reliability of wideband precoding information, and reduces error propagation, thereby further improving the precoding performance.

Figure 4:
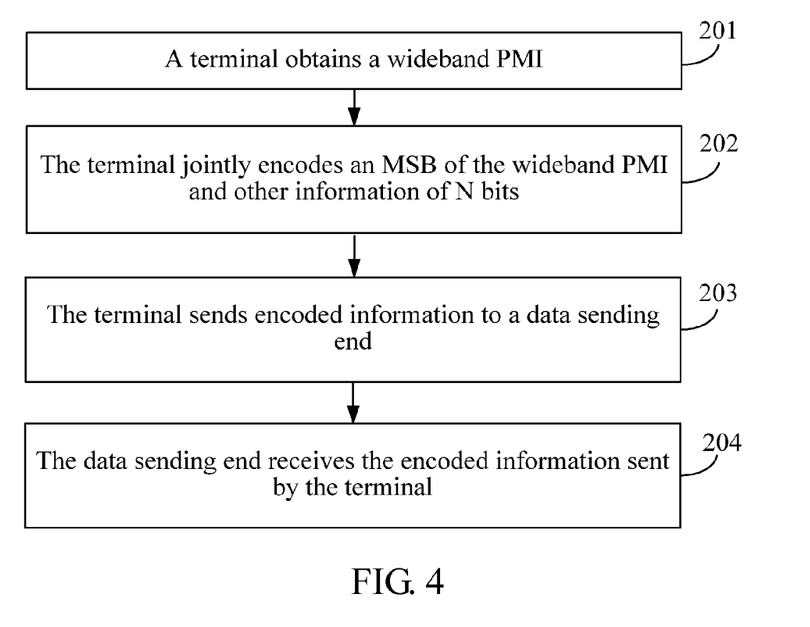
FIG. 4 is a schematic flowchart of another method of sending and receiving precoding information provided by an embodiment of the present invention.

Referring to FIG. 4, an embodiment of the present invention provides a method of sending precoding information, where the system wideband is divided into at least one sub-band, and the method includes the following steps:

201: A terminal obtains a wideband PMI.

Specifically, the terminal may obtain the wideband PMI according to a preset criterion, and definitely may also obtain the wideband PMI according to other methods in the prior art. In an example where the terminal obtains the wideband PMI according to the preset criterion, the terminal may calculate the wideband precoding matrix indicator PMI on the basis of a preset criterion 1, which is specifically shown in Equation (1). Definitely, the target function corresponding to the preset criterion may also be flexibly set according to an actual application condition, which is not specifically restricted here.

Alternatively, the terminal calculates the wideband precoding matrix indicator PMI on the basis of a preset criterion 2, which is specifically shown in Equations (2) and (3). Definitely, the target function corresponding to the preset criterion may also be flexibly set according to an actual application condition, which is not specifically restricted here.

Further, after obtaining the wideband PMI, the method may also include the following steps.

202: The terminal jointly encodes an MSB of the wideband PMI and other information of N bits, where the MSB is a part of the wideband PMI.

Specifically, the MSB (Most Significant Bits, Most Significant Bit) of the wideband PMI obtained in step 201 is represented by A bits, and the other information of N bits may be other bits of the wideband PMI than the MSB, such as a rank indication RI, or acknowledgment (ACK/NACK) information of a hybrid automatic retransmission request HARQ. The terminal combines the MSB of the wideband PMI and the other information of N bits into a bit sequence with a length of A+N.

Further, the terminal encodes the bit sequence with the length of A+N through a code (20, A+N), and the encoding may be similar to that in the embodiment shown in FIG. 1.

Definitely, an applied encoding method may also be flexibly selected according to an actual application condition, which is not specifically restricted here.

Moreover, it should be noted that, the MSB of the wideband PMI may be a part of the wideband PMI, or may be all bits of the wideband PMI.

203: The terminal sends the encoded information to a data sending end.

Specifically, the terminal may send the encoded information to the data sending end through a physical uplink control channel PUCCH. Further, when the encoded information is sent through the PUCCH, a period same as the period of the rank indication (RI) may be used; or, the terminal may send the encoded information to the data sending end through a physical uplink shared channel PUSCH.

Further, the encoded information may be mapped to a position that is on the two sides of a PUSCH demodulation pilot or reference signal and is adjacent to the demodulation pilot or reference signal (Reference Signal, RS) through a channel interleaver, as shown in FIG. 2 or FIG. 3, where S0 to S13 represent SC-FDMA symbols in a sub-frame, MSB blocks show positions to which the encoded information is mapped, and RS blocks show positions to which the RS is mapped.

Further, when the PUSCH adopts MIMO (multiple input multiple output, multiple input multiple output) multi-layer transmission, the encoded information may be mapped to all layers for transmission.

204: The data sending end receives the encoded information sent by the terminal.

Specifically, the data sending end may receive the encoded information sent by the terminal through a physical uplink control channel PUCCH or, specifically, the data sending end may receive the encoded information sent by the terminal through a physical uplink shared channel PUSCH.

Further, when the data sending end receives the encoded information sent by the terminal through the physical uplink shared channel PUSCH, the encoded information may be mapped to a position that is on the two sides of a demodulation pilot or reference signal and is adjacent to the demodulation pilot or reference signal through a channel interleaver, and received at positions shown by MSBs in FIG. 2 or FIG. 3.

It should be further noted that, a mapping relationship exists between a precoding matrix indicator PMI and a precoding matrix, the mapping relationship enables a distance between precoding matrixes corresponding to two PMIs with different most significant bits MSBs to be greater than a distance between precoding matrixes corresponding to two PMIs with different least significant bits LSBs, and the distance may be defined as a chord distance, as shown in Equation (5). Definitely, the distance may also be flexibly defined according to an actual application condition, which is not specifically restricted here.

It should be noted that, the MSB of the wideband PMI may be a part of the wideband PMI, or may be all bits of the wideband PMI.

Moreover, it should be noted that, after obtaining the MSB of the wideband PMI, the data sending end may further obtain a reliable wideband or frequency selectivity precoding matrix, together with wideband or frequency selectivity precoding information obtained through other feedback manners.

In the method of sending and receiving precoding information described in the embodiment of the present invention, the MSB in the wideband PMI and other information of N bits are jointly encoded and sent, which improves reliability of wideband precoding information, and reduces error propagation, thereby further improving the precoding performance.

Figure 5:
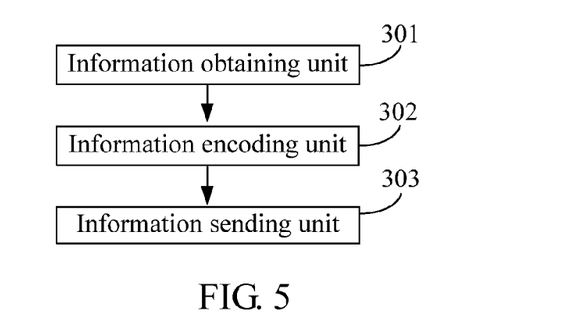
FIG. 5 is a schematic structural diagram of a device of sending precoding information provided by an embodiment of the present invention.

Referring to FIG. 5, corresponding to the above method embodiments, an embodiment of the present invention provides a device of sending precoding information. The device is applicable to a system in which bandwidth is divided into at least one sub-band, and includes units as described below.

An information obtaining unit 301 is configured to obtain a wideband precoding matrix indicator PMI.

Specifically, a terminal may obtain the wideband PMI according to a preset criterion, and definitely may also obtain the wideband PMI according to other methods in the prior art. In an example where the terminal obtains the wideband PMI according to the preset criterion, the information obtaining unit calculates the wideband precoding matrix indicator PMI on the basis of a preset criterion 1, which is specifically shown in Equation (1).

Alternatively, the information obtaining unit calculates the wideband precoding matrix indicator PMI on the basis of a preset criterion 2, which is specifically shown in Equations (2) and (3).

Definitely, the target function corresponding to the preset criterion may also be flexibly set according to an actual application condition, which is not specifically restricted here.

An information encoding unit 302 is configured to separately encode an MSB of the wideband PMI or jointly encode the MSB of the wideband PMI and other information of N bits to obtain encoded information, where the MSB is a part of the wideband PMI, and N is a natural number.

An information sending unit 303 is configured to send the information encoded by the information encoding unit to a data sending end.

The device of sending precoding information in the embodiment of the present invention may be specifically a terminal.

In the device of sending precoding information described in the embodiment of the present invention, the MSB in the wideband PMI is separately encoded and sent, or the MSB in the wideband PMI and other information of N bits are jointly encoded and sent, which improves reliability of wideband precoding information, and reduces error propagation, thereby further improving the precoding performance.

Figure 6:
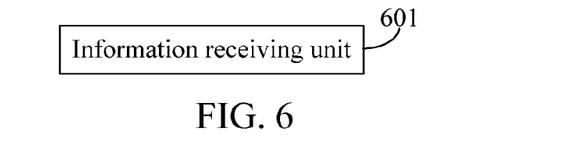
FIG. 6 is a schematic structural diagram of a device of receiving precoding information provided by an embodiment of the present invention.

Referring to FIG. 6, corresponding to the above method embodiments, an embodiment of the present invention provides a device of receiving precoding information. The device is applicable to a system in which bandwidth is divided into at least one sub-band, and includes:

An information receiving unit 601 is configured to receive encoded information sent by a terminal. Here, the encoded information is information obtained, after the terminal obtains the wideband precoding matrix indicator PMI, through separately encoding an MSB of a wideband PMI or jointly encoding the MSB of the wideband PMI and other information of N bits, where the MSB is a part of the wideband PMI, and N is a natural number.

In the device of receiving precoding information described in the embodiment of the present invention, the information sent by the terminal after separately encoding the MSB in the wideband PMI or jointly encoding the MSB in the wideband PMI and other information of N bits is received, which improves reliability of wideband precoding information, and reduces error propagation, thereby further improving the precoding performance.

The data sending end in the above embodiments may be a NodeB (node B), a BS (Base Station, base station), a home base station, or a relay station; and the terminal in the above embodiments may be a UE (User Equipment, user equipment) or an MS (Mobile Station, mobile station).

All or a part of the content in the technical solutions according to the embodiments of the present invention may be implemented through software programming. The software program is stored in a readable storage medium, such as a hard disk, an optical disk or a floppy disk in a computer.

The above descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method comprising:
   encoding, by a terminal, jointly at least one bit but not all bits of a wideband precoding matrix indicator (PMI) with a rank indication (RI) to obtain encoded information, wherein the at least one bit of the wideband PMI jointly encoded with the RI contains no least significant bit (LSB) of the wideband PMI; and
   sending, by the terminal, the encoded information to a data sending end,
   wherein when the terminal sends the encoded information through a physical uplink shared channel (PUSCH), the encoded information is mapped to a resource position that is on two sides of a demodulation pilot or a reference signal through a channel interleaver.

2. The method according to claim 1, wherein sending the encoded information to the data sending end comprises sending the encoded information through a physical uplink control channel (PUCCH) or the PUSCH.

3. The method according to claim 1, wherein the encoded information is mapped to be adjacent to the demodulation pilot or the reference signal.

4. The method according to claim 1, wherein the PUSCH adopts multiple input multiple output (MIMO) multi-layer transmission and the encoded information is mapped to all layers for transmission.

5. The method according to claim 1, wherein the data sending end is a base station or a node B.

6. A method comprising:
   receiving, by a data sending end, encoded information from a terminal, wherein the received encoded information is formed at the terminal by jointly encoding at least one bit but not all bits of a wideband precoding matrix indication (PMI) with a rank indication (RI), and the at least one bit of the wideband PMI jointly encoded with the RI contains no least significant bit (LSB) of the wideband PMI; and
   decoding, by the data sending end, the received encoded information, wherein when the data sending end receives the encoded information through a physical uplink shared channel (PUSCH), the encoded information is mapped to a resource position that is on two sides of a demodulation pilot or a reference signal through a channel interleaver.

7. The method according to claim 6, wherein receiving the encoded information comprises receiving the encoded information through a physical uplink control channel (PUCCH) or the PUSCH.

8. The method according to claim 6, wherein the encoded information is mapped to be adjacent to the demodulation pilot or the reference signal.

9. The method according to claim 6, wherein the PUSCH adopts multiple input multiple output (MIMO) multi-layer transmission, and the encoded information is mapped to all layers for transmission.

10. The method according to claim 6, wherein the data sending end is a base station or a node B.

11. A terminal device comprising:
an information encoding unit, configured to jointly encode at least one bit but not all bits of a wideband precoding matrix indicator (PMI) with a rank indication (RI) to obtain encoded information, wherein the at least one bit of the wideband PMI jointly encoded with the RI contains no least significant bit (LSB) of the wideband PMI; and
an information sending unit, configured to send the encoded information to a data sending end,
wherein when the encoded information is sent through a physical uplink shared channel (PUSCH), the encoded information is mapped to a resource position that is on two sides of a demodulation pilot or a reference signal through a channel interleaver.

12. The terminal device according to claim 11, wherein the encoded information is sent through a physical uplink control channel (PUCCH) or the PUSCH.

13. The terminal device according to claim 11, wherein the encoded information is mapped to be adjacent to the demodulation pilot or the reference signal.

14. The terminal device according to claim 11, wherein a mapping relationship exists between a PMI and a precoding matrix and the mapping relationship enables a distance between precoding matrixes corresponding to two PMIs with different most significant bits (MSBs) to be greater than a distance between precoding matrixes corresponding to two PMIs with different LSBs.

15. The terminal device according to claim 11, wherein the data sending end is a base station or a node B.

16. A network device comprising:
an information receiving unit, configured to receive encoded information from a terminal, wherein the received encoded information is formed at the terminal by jointly encoding at least one bit but not all bits of a wideband precoding matrix indicator (PMI) with a rank indication (RI), and the at least one bit of the wideband PMI jointly encoded with the RI contains no least significant bit (LSB) of the wideband PMI; and
a decoding unit, configured to decode the received encoded information,
wherein when the encoded information is received through a physical uplink shared channel (PUSCH), the encoded information is mapped to a resource position that is on two sides of a demodulation pilot or a reference signal through a channel interleaver.

17. The network device according to claim 16, the encoded information is received through a physical uplink control channel (PUCCH) or the PUSCH.

18. The network device according to claim 16, wherein the encoded information is mapped to be adjacent to the demodulation pilot or the reference signal.

19. The network device according to claim 16, wherein the PUSCH adopts multiple input multiple output (MIMO) multi-layer transmission, and the encoded information is mapped to all layers for transmission.

20. The network device according to claim 16, wherein the network device is a base station or a node B.

* * * * *